(12) United States Patent
Niimura

(10) Patent No.: US 7,620,701 B2
(45) Date of Patent: Nov. 17, 2009

(54) IMAGE CAPTURE DEVICE

(75) Inventor: Ikuo Niimura, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 11/225,329

(22) Filed: Sep. 13, 2005

(65) Prior Publication Data
US 2006/0059202 A1    Mar. 16, 2006

(30) Foreign Application Priority Data
Sep. 14, 2004    (JP) .............................. 2004-267517

(51) Int. Cl.
  G06F 15/16   (2006.01)
  G06F 15/173  (2006.01)
  H04N 5/76    (2006.01)
(52) U.S. Cl. .................. 709/219; 709/224; 348/231.6
(58) Field of Classification Search ................. 709/219, 709/224; 348/231.6, 345–357, 360–368
See application file for complete search history.

(56) References Cited

U.S. PATENT DOCUMENTS

| | | | |
|---|---|---|---|
| 5,806,005 A * | 9/1998 | Hull et al. .................. 455/566 |
| 6,166,729 A * | 12/2000 | Acosta et al. ............... 715/719 |
| 6,337,712 B1 * | 1/2002 | Shiota et al. ............. 348/231.1 |
| 6,700,618 B1 * | 3/2004 | Chubachi .................... 348/354 |
| 6,967,675 B1 * | 11/2005 | Ito et al. .................. 348/207.1 |
| 7,205,958 B2 * | 4/2007 | Yamazaki .................... 345/1.1 |
| 7,457,859 B1 * | 11/2008 | Schick et al. ............... 709/223 |
| 2004/0109066 A1 * | 6/2004 | Inoue et al. ............ 348/207.99 |
| 2004/0140971 A1 * | 7/2004 | Yamazaki et al. ........... 345/204 |
| 2004/0147840 A1 * | 7/2004 | Duggirala et al. ........... 600/437 |
| 2004/0174434 A1 * | 9/2004 | Walker et al. ............. 348/211.3 |

FOREIGN PATENT DOCUMENTS

JP    2003-283900 A    10/2003

* cited by examiner

Primary Examiner—Joseph E Avellino
Assistant Examiner—Catherine Thaw
(74) Attorney, Agent, or Firm—Canon U.S.A., Inc., IP Division

(57) ABSTRACT

An image capture device is capable of transmitting captured images to a file server on a computer network. The image capture device stores the state of the communication environment with the file server, transmits a signal, based on the stored communication settings, to the file server to determine the state of the communication environment with the file server, and determines, based on the results of transmitting the signal, the communication environment with the file server.

11 Claims, 3 Drawing Sheets

IMAGE CAPTURE DEVICE

BACKGROUND OF THE INVENTION

1. Field of the Invention

The present invention relates to image capture devices, for example, digital cameras and digital video cameras.

2. Description of the Related Art

Recently, many products in compliance with radio communication standards such as IEEE 802.11x (IEEE 802.11a, IEEE 802.11b, IEEE 802.11g, and the like) and Bluetooth have been available, and wireless base stations called hot spots have been installed in, for example, street shops.

In view of environments where wireless LAN technology described above is widely used, a digital camera that enables a user to shoot images without caring about the capacity of a recording medium by storing the captured images in a file server through a wireless LAN is proposed in, for example, Japanese Patent Laid-Open No. 2003-283900.

However, in the digital camera disclosed in this document, the user cannot check before shooting (capturing) images whether communication between the digital camera and the file server can be normally established. Thus, in the case where communication between the digital camera and the file server cannot be normally established, and the user shoots digital images, the shot digital images may not be stored on the file server. For example, when a wireless LAN exists between the digital camera and the file server, the communication link between the two is likely to be unstable based on the location of the digital camera in relation to the wireless LAN's "hotspots". Thus, in many cases, communication between the digital camera and the file server cannot be normally established.

SUMMARY OF THE INVENTION

According to the present invention, in an image capture device, e.g., a digital camera or a digital video camera, having a function for transferring a captured image to a file server on a computer network, users can check whether communication between the image capture device and the file server can be normally established.

According to an aspect of the present invention, an image capture device is capable of transmitting captured images to a file server on a computer network. The image capture device includes a storage unit adapted to store communication settings used to determine the state of the communication environment with the file server, a communication unit adapted to transmit a signal, based on the stored communication settings, to the file server to determine the state of the communication environment with the file server, and a determination unit adapted to determine, based on the results of transmitting the signal, the communication environment with the file server.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DESCRIPTION OF THE EMBODIMENTS

Embodiments of the present invention will be described in detail below with reference to the drawings.

Figure 1:
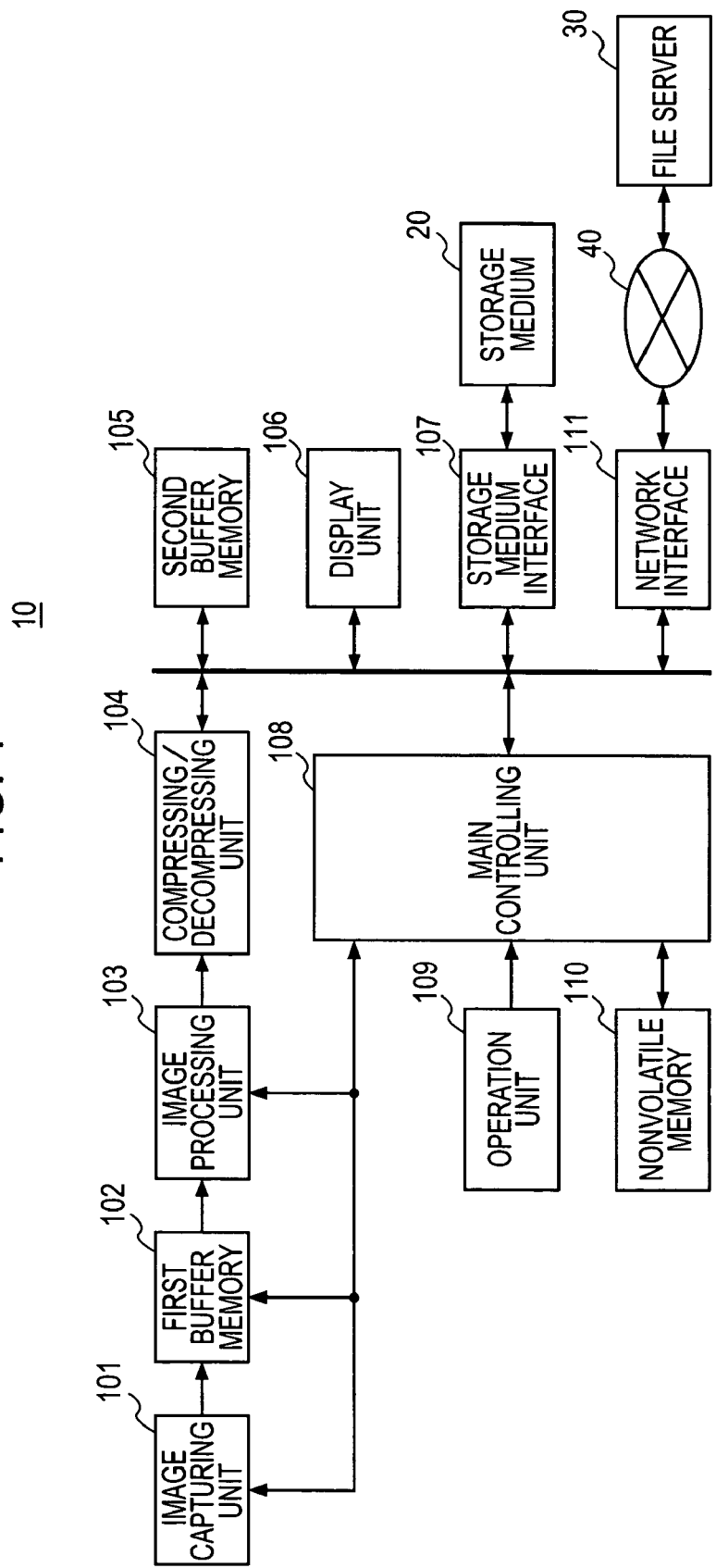
FIG. 1 is a block diagram showing the structure of a digital camera that is a typical image capture device according to an embodiment of the present invention.

FIG. 1 is a block diagram showing the structure of a digital camera 10 that is a typical image capture device according to this embodiment of the present invention.

An image capturing unit 101 converts light beams received by an image sensing element (a CCD image sensor, a CMOS image sensor, or the like) to electrical signals when a shutter button is full-pressed, digitizes these electrical signals to generate digital images, and stores the generated digital images in a first buffer memory 102. When the shutter button remains full-pressed, the image capturing unit 101 continues capturing digital images until the first buffer memory 102 is full. The first buffer memory 102 has a capacity for storing a plurality of digital images.

An image processing unit 103 reads the digital images from the first buffer memory 102 and performs a developing process on these digital images. The developing process includes adjustments of white balance, sharpness, contrast, color space, and resolution. Users can specify the settings of the developing process.

A compressing/decompressing unit 104 compresses the digital images processed in the image processing unit 103 in compliance with an image compressing method, for example, JPEG or JPEG 2000, and decompresses the compressed digital images. Users can select compression rates.

A main controlling unit 108 includes a micro computer for controlling the digital camera 10 according to a control program in a nonvolatile memory 110. The main controlling unit 108 generates image files including the digital images compressed in the compressing/decompressing unit 104 and data associated with these digital images and stores the generated image files in a second buffer memory 105. The associated data includes, for example, data related to the digital images, data related to the digital camera 10, and thumbnails of the digital images. The second buffer memory 105 has a capacity for storing a plurality of image files. The main controlling unit 108 also has a function for changing the operation mode of the digital camera 10 to a power on mode or a power save mode.

A display unit 106 includes a display, such as a liquid crystal display, and displays various types of data on the display. The display unit 106 has a function for displaying data related to the digital camera 10, a function for displaying reduced images of the shot digital images, a function for displaying reduced images of digital images stored in a storage medium 20, and the like. When the reduced images of the digital images stored in the storage medium 20 are displayed, data related to these digital images can be also displayed. The display unit 106 also has a function for providing graphical user interfaces, like, for example, a setting menu.

A storage medium interface 107 has a function for writing the image files stored in the second buffer memory 105 to the storage medium 20 and a function for reading the image files stored in the storage medium 20 to write them to the second buffer memory 105. A typical storage medium 20 is, for example, a memory card, a hard disk drive, or the like, and can be attached to and be detached from the digital camera 10.

An operation unit 109 that is a user interface for operating the digital camera 10 includes a power switch for turning on and off the power of the digital camera 10, a shutter button for starting the shooting of images, a menu button for displaying a setting menu on the display unit 106, a cross shaped button for moving a cursor appearing on the display unit 106 in the horizontal and vertical directions, a selection button for selecting an image or an item pointed by the cursor, and the like. The shutter button can be half-pressed or full-pressed. When the shutter button is half-pressed, the digital camera 10 performs operations such as automatic focusing (AF) and automatic exposure (AE). When the shutter button is full-pressed, the digital camera 10 shoots digital images.

The nonvolatile memory 110 stores the control program for controlling the digital camera 10, the data related to the digital camera 10, data related to a Packet Internet Groper (PING) mode, data related to a file server 30, and the like. The data related to the PING mode includes data indicating, for example, the number of transmissions and a transmission destination address. The nonvolatile memory 110 also stores image data of the setting menu appearing on the display unit 106.

A network interface 111 is in compliance with communication standards of a wired LAN, a wireless LAN such as IEEE 802.11a, IEEE 802.11b, and IEEE 802.11g, and the like. The network interface 111 transfers the image files stored in the second buffer memory 105 to the file server 30, for example, an FTP server, on a computer network 40. A PING command is sent from the network interface 111.

Figure 2:
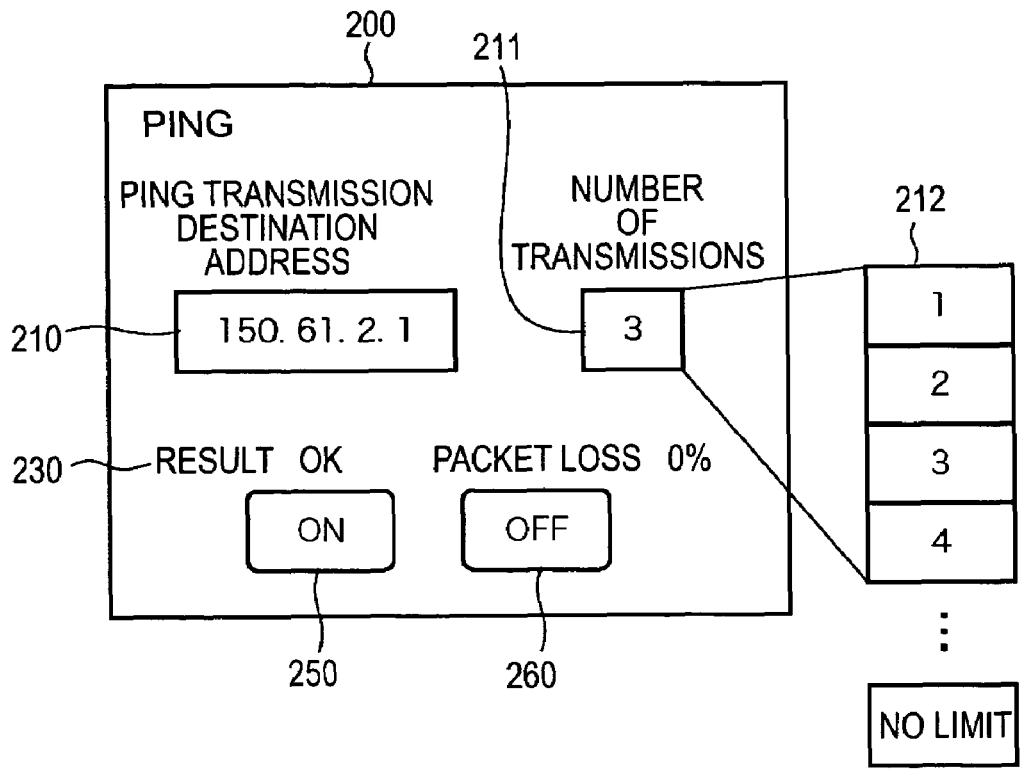
FIG. 2 is a view showing a typical PING setting menu for specifying the settings of a PING function in the digital camera according to the embodiment of the present invention.

FIG. 2 shows a typical PING setting menu for specifying the settings of the PING function in the digital camera 10 according to this embodiment. In the PING setting menu 200, for example, when a user selects and opens the PING setting menu from a hierarchical menu using the menu button and the cross shaped button included in the operation unit 109, the main controlling unit 108 displays the PING setting menu 200 on the display unit 106.

The PING setting menu 200 includes an address input box 210 for inputting a transmission destination address of a PING command and a transmission number input box 211 for specifying the number of PING command transmissions. The number of PING command transmissions may be specified by selecting a value from values ranging from one to an unlimited number of times from a list box 212 as shown in FIG. 2, or may be specified by inputting the number using a keyboard included in the operation unit 109. In FIG. 2, the address input box 210 allows users to input an IP address in the Internet Protocol version 4 (IPv4) format. Alternatively, the address input box 210 may allow users to input an IP address in the Internet Protocol version 6 (IPv6) format.

An "ON" button 250 and an "OFF" button 260 serve as buttons for setting and canceling a PING mode, respectively. Either of these buttons is selected using the cross shaped button in the operation unit 109 and is confirmed by pressing a selection/execution key. When a PING command is transmitted, a message 230, indicating whether a response is returned from the specified IP address and indicating the level of failure, is displayed.

Setting options other than those shown in FIG. 2 may be provided. For example, the following options may be provided: an option for specifying whether a PING command is transmitted to, for example, a domain name system (DNS) server, an option for specifying whether a PING command is automatically transmitted when the power of the digital camera 10 is turned on, and an option for specifying whether a PING command is sequentially transmitted to a plurality of file servers including the file server 30.

For example, after a user selects setting options necessary for communication from a setting menu that is not shown and sets values in the respective setting options so as to activate a communication function through the network interface 111, the user inputs a transmission destination address and selects the "ON" button 250 and confirms the selection in the PING setting menu 200 shown in FIG. 2 to enter the PING mode. In this embodiment, when the shutter button included in the operation unit 109 is half-pressed or full-pressed in the PING mode, the main controlling unit 108 continues transmitting a PING command to the specified transmission destination address as many times as specified in the PING setting menu 200. The main controlling unit 108 may display the result of a transmission in real time in the middle of transmitting a PING command or may display only the final result of the transmission after the transmission is completed, in the PING setting menu 200 as the message 230.

When the number of PING command transmissions is specified in the PING setting menu 200, the main controlling unit 108 transmits a PING command as many times as specified in response to a push operation of the shutter button. In this case, the main controlling unit 108 transmits a PING command as many times as specified even when the shutter button remains pushed. On the other hand, when an unlimited number of PING command transmissions is specified, the main controlling unit 108 continues transmitting a PING command at predetermined intervals until a command for stopping or canceling the transmission is issued once the shutter button is pressed.

Figure 3:
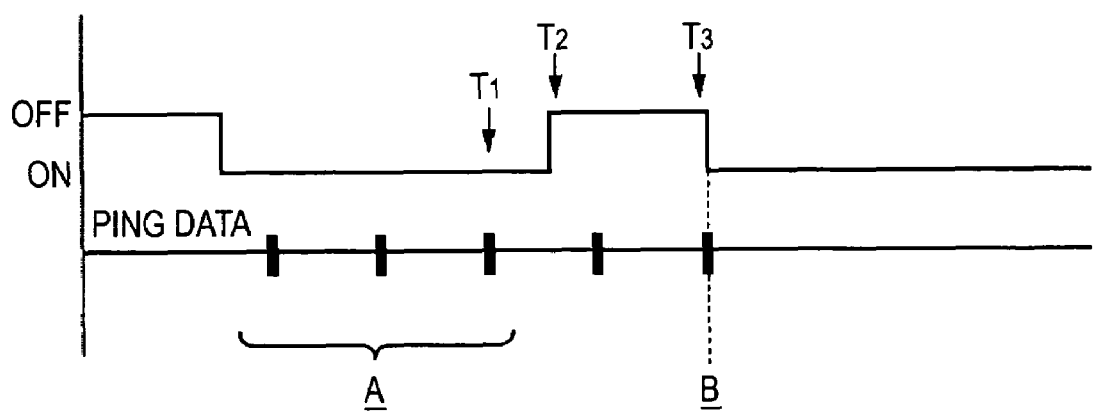
FIG. 3 is a view showing the relationships between the setting of the number of PING command transmissions and operations of a shutter button in the digital camera according to the embodiment of the present invention.

FIG. 3 shows the relationships between the setting of the number of transmissions and operations of the shutter button. For example, in case A in FIG. 3 where a limited number of PING command transmissions is specified (three times in FIG. 3), when the shutter button is turned on, transmission of a PING command is started, and a PING command is transmitted at predetermined intervals while the shutter button is turned on. In this embodiment, when the shutter button is half-pressed or full-pressed, the shutter button is turned on. When a PING command is transmitted as many times as specified (time T1 in FIG. 3), the PING mode is cancelled and the process is completed. On the other hand, in case B in FIG. 3 where an unlimited number of PING command transmissions is specified, when the shutter button is turned on, transmission of a PING command is started, and a PING command is transmitted at predetermined intervals while the shutter button is turned on. However, in this case, even when the shutter button is turned off at time T2, transmission of a PING command continues. Subsequently, when the shutter button is again turned on at time T3, transmission of a PING command is completed and the PING mode is cancelled.

In a case where a shooting priority is set, once the shutter button is released in the middle of transmitting a PING command in a state in which the shutter button is turned on in the PING mode, the PING mode is cancelled even when a PING command is not transmitted as many times as specified, regardless of the specified number of PING command transmissions. Subsequently when the shutter button is pressed, a shooting operation is performed with a higher priority.

Figure 4:
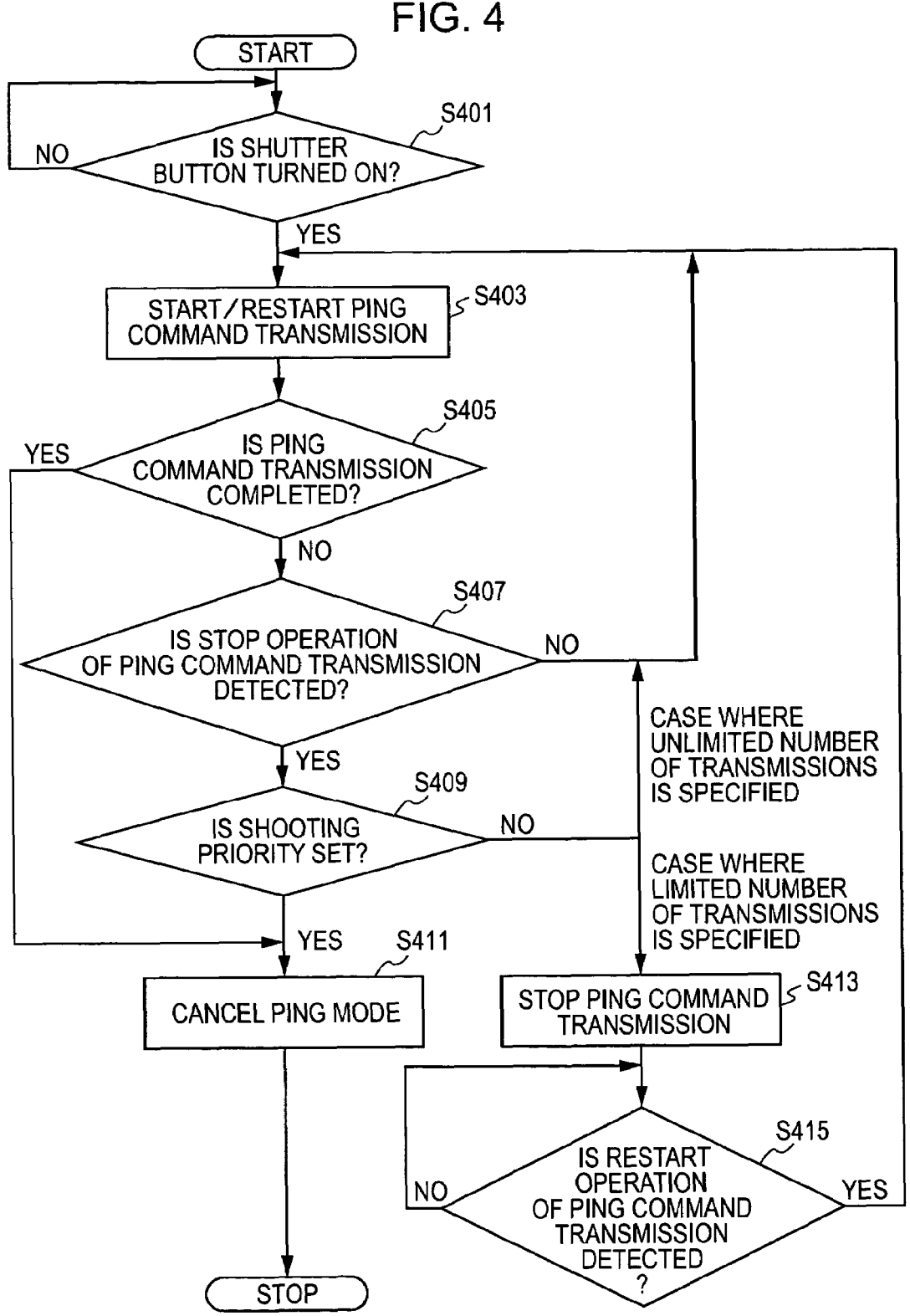
FIG. 4 is a flowchart showing the relationship between the setting of a shooting priority and the operation of the PING function in the digital camera according to the embodiment of the present invention.

FIG. 4 is a flowchart showing the relationship between the setting of a shooting priority and the operation of the PING function.

In the PING mode, it is determined in step S401 whether the shutter button is turned on. When the shutter button is turned on, transmission of a PING command is started in step S403. In the case where a limited number of transmissions is specified, when it is determined in step S405 that transmission of a PING command is transmitted as many times as specified, the process proceeds to step S411 where the PING mode is cancelled, and the process is completed. In the case where an unlimited number of transmissions is specified or a PING command is not transmitted as many times as specified, it is determined in step S407 whether a stop operation of a PING command transmission is detected. Here, a stop operation is an operation for turning off the shutter button.

When a stop operation is detected in step S407, the setting of a shooting priority is checked in step S409. When a shooting priority is set, the PING mode is cancelled in step S411 regardless of the specified number of transmissions and the process is completed.

On the other hand, in a case where a shooting priority is not set, when an unlimited number of transmissions is specified, transmission of a PING command continues as shown in FIG. 3. When a limited number of transmissions is specified, transmission of a PING command is stopped in step S413 and the process waits for an instruction for restarting transmission of a PING command, i.e., the shutter button is turned on, in step S415. In step S415, when a restart operation is detected, the process goes back to step S403 where transmission of a PING command is restarted.

Either the shooting function or the PING function may be selected as a higher priority in a setting option of the digital camera 10 or may be predetermined as a higher priority.

As shown in FIG. 2, values of the setting options of the digital camera 10 according to the present invention may be set by operating the operation unit 109 of the digital camera 10 through a GUI or the like. Alternatively, these values may be set by preparing the settings using PC application software and writing the settings to the storage medium 20, which is removable, and then by importing the settings written to the storage medium 20 into the digital camera 10. Alternatively still, these values may be set by retrieving a setting file from the network interface 111 and then by importing the content of the setting file.

Moreover, a PING command may be transmitted at a timing other than the timing of operating the shutter button. For example, a PING command may be automatically transmitted for checking the availability of the communication at timing of activating the digital camera 10 when the use of the data communication function is enabled upon checking whether the use of the data communication function is enabled. Then, when the communication is available, the user may be notified that the communication with the communication partner is available. Alternatively, the user may be notified only when the communication is unavailable.

Moreover, a PING command may be automatically transmitted when the user changes data related to the communication with the communication partner, for example, a communication partner IP address, a service set ID (SSID), a key related to coding, an FTP server address, a login name, a password, a DNS address, and a proxy server address. Alternatively, when an instruction is issued so that the communication setting data stored in the storage medium 20 is imported to the setting data of the digital camera 10, a PING command may be automatically transmitted to a transmission destination address for checking the availability of the communication after the setting data of the digital camera 10 is changed. In this case, the user may be notified of the current state of the communication depending on the availability of the communication.

When a plurality of file servers are allowed to be set and a PING command is allowed to be automatically transmitted upon activating the digital camera 10 or upon changing the settings of the digital camera 10 in the settings of the communication function of the digital camera 10, a PING command may be sequentially transmitted to a plurality of specified server addresses to search for a file server that is currently available for communication, based on the result of transmission of a PING command. In this case, the user may be simply notified that the communication is available or may be notified of an IP address of a file server that is available for communication. When no file server is available for communication in the specified file servers, the user may be notified of the state. When the communication with a file server specified as a server that is to be first accessed is not available, the user may be allowed to select one from the other specified file servers or to register a new file server. When the communication with any of the specified file servers is not available, the user may be requested to register or to select a new file server.

The state of the communication environment can be checked with the result of the transmission test using the PING function. When one hundred percent of the transmission packet is transmitted, i.e., the packet loss rate is zero percent, there is no problem with the communication environment. In contrast, when zero percent of the transmission packet is transmitted, the communication is not available. In some cases, the packet loss rate is more than zero percent and less than one hundred percent. When less than one hundred percent or less than a predetermined percent, i.e., the packet loss rate is more than zero and equal to a predetermined percent or more, of the transmission packet is transmitted in the transmission test using the PING function, a warning may be output to the display unit 106 to recommend the user to store a shot image in the storage medium 20 or a built-in memory for safely processing the shot image. Alternatively, the shot image may be recorded in the storage medium 20 or the built-in memory in parallel with data transmission to the server through the network interface 111. This parallel recording of the shot image may be performed depending on the level of the packet loss rate, or the parallel recording may not be performed and only the data transmission to the server may be performed in response to a user instruction even when the necessary conditions for the parallel recording are satisfied.

OTHER EMBODIMENTS

In the embodiment described above, different transmission operations of a PING command correspond to the same operation of the shutter button depending on whether the number of PING command transmissions is a limited number or an unlimited number. Alternatively, the setting of an unlimited number may be replaced with the setting of an undefined number in which a PING command is continuously transmitted only while a user instruction for transmitting a PING command is valid. In the setting of an undefined number, transmission of a PING command may be performed only while the shutter button is turned on, and may be stopped when the shutter button is turned off, as in the setting of a limited number.

The present invention may include an embodiment in which a software program that performs the functions according to the embodiments described above is provided to a system or a device including a computer that can execute the program, directly from a recording medium or by wire or air, and the computer executes the provided program to achieve functions equivalent to those described above.

Thus, the present invention may be implemented also by the program codes, which are provided to and installed in the computer to perform the functions according to the present invention. That is to say, the present invention may include the computer program, which performs the functions according to the present invention.

In this case, the program may take any form, for example, object codes, a program executed by an interpreter, or script data provided for an operating system (OS), so long as they have the program functions described above.

Typical recording media for providing the program are magnetic recording media, for example, floppy disks, hard disks, and magnetic tapes, optical or magneto-optical storage media, for example, MO disks, CD-ROMs, CD-Rs, CD-RWS, DVD-ROMS, and DVD-Rs, and nonvolatile semiconductor memories.

In a typical method for providing the program by wire or air, a program data file serving as the computer program according to the present invention, which is executable on a client computer, is stored in a server on a computer network, and the program data file is downloaded to a client computer that accesses the server. The program data file may be the computer program according to the present invention as is or a file that is generated by compressing the computer program and that has an automatic installation function. In this case, the program data file may be divided into a plurality of segment files, and these segment files may be located in different servers.

That is to say, a server unit that allows a plurality of users to download the program data file for performing the functions according to the present invention on a computer is also included in the scope of the present invention.

Moreover, the program according to the present invention may be encoded and stored in a storage medium, for example, a CD-ROM, and distributed to users. Then, users who satisfy predetermined conditions may download key information for decoding from a home page through the Internet, and the encoded program may be decoded using the key information and installed in a computer to realize the present invention.

Moreover, other than the case where the program is read out and executed by a computer to perform the functions according to the embodiments described above, for example, an OS operating on a computer may execute some or all of the actual processing to perform the functions according to the embodiments described above, based on an instruction from the program.

Moreover, the program read out from a recording medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions according to the embodiments described above, based on an instruction from the program.

While the above embodiments have been described using a PING command to check the state of the communication environment between the image capture device and the file server, the method for checking the state of the communication environment is not limited to this approach. Any method for checking the state of the communication environment that would enable practice of the present invention is applicable.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-267517 filed Sep. 14, 2004, which is hereby incorporated by reference herein in its entirety.

What is claimed is:

1. An image capture device capable of transmitting captured images to a file server via a network, the image capture device comprising:

a capturing unit adapted to capture an image of a subject and acquire image data;

an operation unit adapted to receive an instruction from a user to perform a preparation process for image capturing by the capturing unit, wherein the preparation process is an autofocus (AF) process or an autoexposure (AE) process;

a storage unit adapted to store communication settings used to communicate with the file server;

a communication unit adapted to transmit a packet internet groper (PING) command in response to the user operating the operation unit to instruct the image capture device to perform the preparation process, based on the stored communication settings, to the file server to determine whether or not the image capture device is in a state capable of communicating with the file server; and a determination unit adapted to determine, based on the results of transmitting the packet internet groper (PING) command, whether or not the image capture device is in a state capable of communicating with the file server.

2. An image capture device according to claim 1, wherein the communication unit transmits the PING command to the file server when the image capture device is activated.

3. An image capture device according to claim 1, wherein the communication unit transmits the PING command to the file server when any of the communication settings are modified.

4. An image capture device according to claim 1, further comprising:

a recording unit adapted to record the captured image on a recording medium; and a warning unit adapted to warn a user to record the captured image on the recording medium when the determination unit determines that the image capture device is not in a state capable of communicating with the file server.

5. An image capture device according to claim 1, wherein capturing images is set as a higher priority than transmitting the PING command, and transmission of the PING command is cancelled if capturing is initiated during transmission of the PING command.

6. A computer-readable storage medium for storing computer-executable process steps provided to implement storing the communication settings, transmitting the PING command, and determining a communication state according to claim 1.

7. An image capture device according to claim 1, wherein the communication unit transmits the PING command a predetermined number of times to the file server.

8. An image capture device according to claim 7, further comprising a configuration unit adapted for the user to set the number of times the PING command is transmitted by the communication unit.

9. An image capture device according to claim 1, wherein the operation unit is a shutter button, and the preparation process is preformed for image capturing by the capturing unit when the operation unit is half-pressed and image capturing is performed when the operation unit is fully pressed.

10. An image capture device according to claim1, wherein the image capture device is capable of communication with a plurality of file servers.

11. An image capture device according to claim 10, wherein the communication unit sequentially transmits the PING command to the plurality of file servers to search for a file server available for communication.

* * * * *